United States Patent
Liu et al.

(10) Patent No.: US 7,757,072 B2
(45) Date of Patent: Jul. 13, 2010

(54) METHOD AND APPARATUS FOR PRESENTING DRIVERS STORED ON UTILITY PARTITION OF HARD DISK THROUGH VIRTUAL FLOPPY TO OPERATING SYSTEM INSTALLER

(75) Inventors: Wei Liu, Austin, TX (US); Kevin W. Deike, Cedar Park, TX (US); Manoj Gujarathi, Round Rock, TX (US); Mukund P. Khatri, Austin, TX (US); Charles T. Perusse, Jr., Pflugerville, TX (US); Theodore Webb, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 858 days.

(21) Appl. No.: 11/466,166

(22) Filed: Aug. 22, 2006

(65) Prior Publication Data

US 2008/0052502 A1    Feb. 28, 2008

(51) Int. Cl.
*G06F 15/177* (2006.01)
(52) U.S. Cl. .............................................. 713/1; 713/2
(58) Field of Classification Search ...................... 713/1
See application file for complete search history.

(56) References Cited

U.S. PATENT DOCUMENTS

| | | | |
|---|---|---|---|
| 5,546,585 A | 8/1996 | Soga | 395/700 |
| 5,643,086 A | 7/1997 | Alcorn et al. | 463/29 |
| 6,199,159 B1 | 3/2001 | Fish | 713/2 |
| 6,473,655 B1 | 10/2002 | Gould et al. | 700/5 |
| 6,658,563 B1 * | 12/2003 | Ice et al. | 713/2 |
| 2003/0065875 A1 | 4/2003 | Van Cleve et al. | 711/102 |
| 2003/0065913 A1 * | 4/2003 | Cepulis et al. | 713/1 |

OTHER PUBLICATIONS

"HP Integrated Lights-Out User Guide" Aug. 2002 (Third Edition), p. [1-2]-[1-4], [3-18]-[3-27].*

* cited by examiner

*Primary Examiner*—Chun Cao
(74) *Attorney, Agent, or Firm*—Baker Botts L.L.P.

(57) ABSTRACT

Installable device drivers may be stored on a partition, e.g., Utility Partition (UP) or other OEM partition, of an original equipment manufacturer (OEM) storage device, e.g., hard disk drive, by associating an INT13h Basic Input-Output System (BIOS) interrupt call, e.g., reading from floppy disk drive a: or drive b: a desired storage device driver during the normal course of installing an operating system (OS), e.g., Microsoft Windows, Linux, BSD, Unix, etc., on the information handling system, e.g., personal computer, server, blade server, storage array, workstation, etc. The run-time loading of a raw floppy image having OS installable drivers residing in the Utility Partition or other hidden partition on the hard disk may be presented as a virtual floppy disk drive to the OS installer, e.g., person (manual) or scripted (automated) process.

16 Claims, 3 Drawing Sheets

METHOD AND APPARATUS FOR PRESENTING DRIVERS STORED ON UTILITY PARTITION OF HARD DISK THROUGH VIRTUAL FLOPPY TO OPERATING SYSTEM INSTALLER

TECHNICAL FIELD

The present disclosure relates generally to information handling systems and, more particularly, to information handling systems having storage device drivers stored on a utility partition of a hard disk drive and installation therefrom of the necessary storage device drivers.

BACKGROUND

As the value and use of information continues to increase, individuals and businesses seek additional ways to process and store information. One option available to users are information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems, e.g., computer, personal computer workstation, portable computer, computer server, print server, network router, network hub, network switch, storage area network disk array, RAID disk system and telecommunications switch.

When installing an operating system on an information handling system having hard disk controllers, e.g., controllers for Small Computer System Interface (SCSI), Redundant Array of Inexpensive Disks or Resilient Array of Independent Disks (RAID), and/or Advanced Host Controller Interface (AHCI), etc., required storage device software drivers must be loaded during text mode setup of Microsoft Windows operating systems. Due to limitations of the Windows text-mode setup, and in future versions of the Windows operating system, the required storage device software drivers must either already be included in the Windows operating system installation media, e.g., compact disc (CD) or be manually provided and installed by an information handling system user or administrator having an original equipment manufacturer (OEM) storage device driver on a media to be loaded into the information handling system in a similar fashion as the Windows operating system media may be loaded therein.

The computer industry is moving away from floppy disk drives for cost, security and storage capacity reasons. Thus installation of OEM storage device drivers not found on a Windows operating system installation media (e.g., CD), may require using other types of removable storage media such as Universal Serial Bus (USB) floppies and/or floppy disk emulated USB keys to provide the storage device drivers during installation of the operating system on the information handling system.

In order for the installation of OEM device drivers not found on a Windows operating system installation media to be successful, the user or administrator has to find the right storage device drivers either OEM bundled storage device driver media, or from the Internet and save the drivers on a floppy disk media. Thus, a person must always be physically present to hit a hot-key during a very short time window of a device installation phase. While it is possible to install the correct operating system storage device driver in this manner, it is relatively a complicated and time consuming procedure, especially when installing operating system software onto hundreds of information handling system computer servers. Floppy disk media has limited storage capacity and thus may not be sufficient for some storage device drivers, and may not have the capacity for storing more than one storage device at a time.

SUMMARY

What is needed is a simple way to store at least one storage device driver on a non-volatile storage medium that is not size constrained and may be accessed during an operating system installation using normal installation procedures that may be transparent during the operating system and storage device driver(s) installation on an information handling system.

According to teachings of this disclosure, installable device drivers may be stored on a partition, e.g., Utility Partition (UP) or other OEM partition, of an original equipment manufacturer (OEM) storage device, e.g., hard disk drive, by associating an INT13h Basic Input-Output System (BIOS) interrupt call, e.g., reading from floppy disk drive a: or drive b: a desired storage device driver during the normal course of installing an operating system (OS), e.g., Microsoft Windows, Linux, BSD, Unix, etc., on the information handling system, e.g., personal computer, server, blade server, storage array, workstation, etc. The run-time loading of a raw floppy image having OS installable drivers residing in the Utility Partition or other hidden partition on the hard disk may be presented as a virtual floppy disk drive to the OS installer, e.g., person (manual) or scripted (automated) process.

In the storage device, a reserved portion of the Master Boot Record (MBR) or a reserve location inside the UP may be used as a pointer to a starting address of a raw floppy disk image residing on the UP (may be a compressed copy), and may have a header indicating the size of the floppy disk image for the BIOS to locate and load the raw floppy disk image. This raw floppy image may be validated before use, e.g., a checksum or cyclic redundancy check (CRC) may be performed for verification thereof.

According to a specific example embodiment of this disclosure, a method for presenting drivers stored on a utility partition of a hard disk to an operating system installer may comprise: determining whether a virtual floppy is enabled in a basic input/output system (BIOS) setup; determining whether a utility partition is present on a hard disk; determining whether a valid floppy image is located in the utility partition; installing an INT13h handler for the virtual floppy; assigning an unused floppy drive number to the virtual floppy; and entering an INT19h.

According to another specific example embodiment of this disclosure, a method for providing device drivers during an operating system installation on an information handling system may comprise: supplying a hard disk having at least one device driver in a floppy disk image on a utility partition of the hard disk, the hard disk being coupled to an information handling system; enabling a virtual floppy in a basic input/output system (BIOS) setup of the information handling system; installing an INT13h handler for the virtual floppy; assigning an unused floppy drive number to the virtual floppy; and entering an INT19h.

According to yet another specific example embodiment of this disclosure, an apparatus in an information handling system having a hard disk drive with a utility partition in which a virtual floppy disk image of at least one storage device driver is stored may comprise: a hard disk with a utility partition in which a virtual floppy disk image of at least one storage device driver is stored, the hard disk being coupled to an information handling system; and a basic input/output system (BIOS) in the information handling system, the BIOS having a virtual floppy setup; wherein the BIOS has an INT13h handler for the virtual floppy, the BIOS assigns an unused floppy drive number to the virtual floppy, and the BIOS enters an INT19h.

BRIEF DESCRIPTION OF THE DRAWINGS

A more complete understanding of the present disclosure thereof may be acquired by referring to the following description taken in conjunction with the accompanying drawings wherein.

Figure 1:
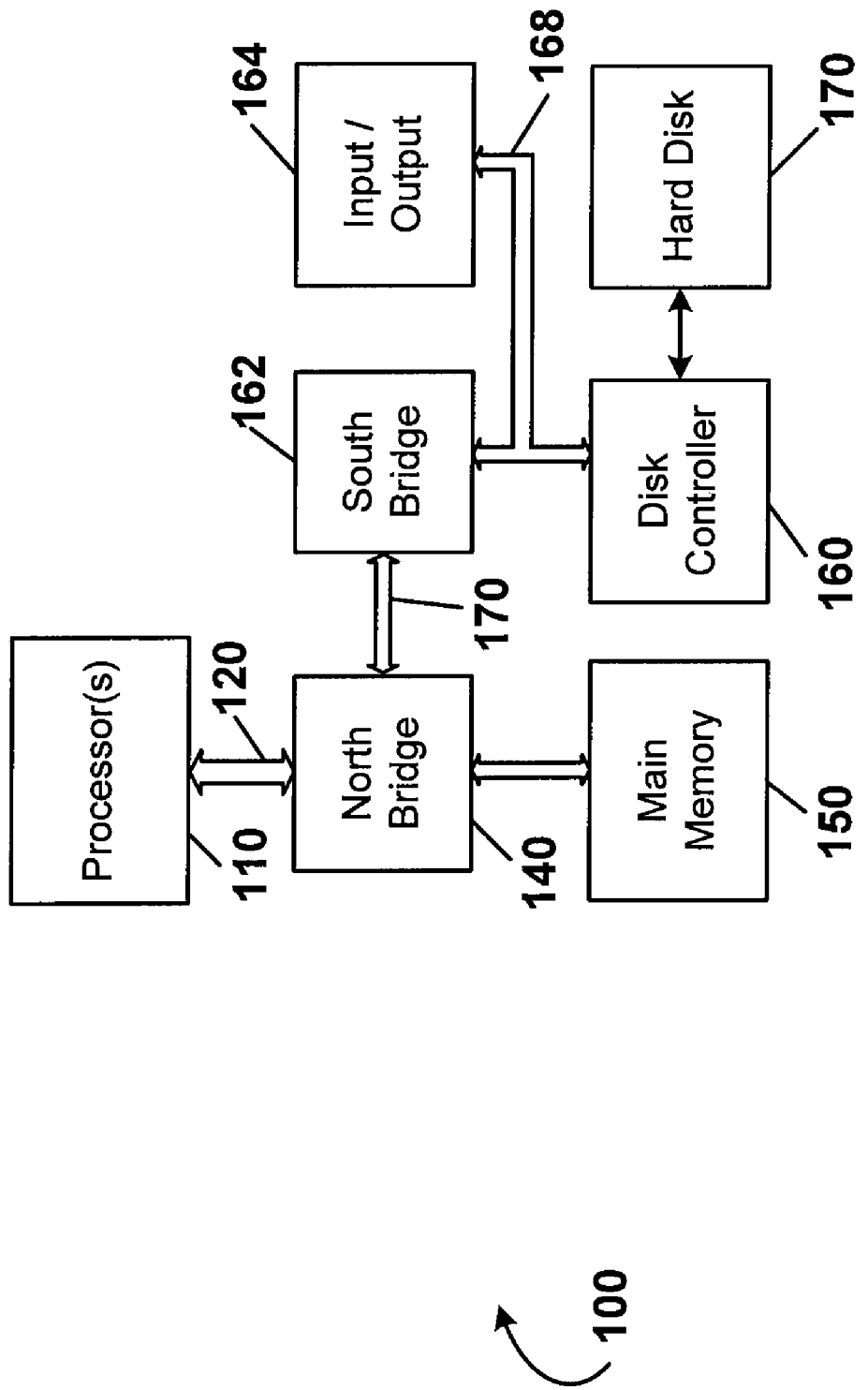
FIG. 1 is a schematic block diagram of an information handling system having electronic components mounted on at least one printed circuit board (PCB) (motherboard not shown) and communicating data and control signals therebetween over signal buses.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU), hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring now to the drawings, the details of specific example embodiments are schematically illustrated. Like elements in the drawings will be represented by like numbers, and similar elements will be represented by like numbers with a different lower case letter suffix.

Referring to FIG. 1, depicted is a schematic block diagram of an information handling system having electronic components mounted on at least one printed circuit board (PCB) (motherboard not shown) and communicating data and control signals therebetween over signal. In one example embodiment, the information handling system is a computer system. The information handling system, generally referenced by the numeral 100, may comprise one or more processor(s) 110, a north bridge 140, which may also be referred to as a memory controller hub or a memory controller that is coupled to a main system memory 150, a south bridge 162, a disk controller 160, input-output interfaces 164, and a hard disk(s) 170. The north bridge 140 is coupled to the processor(s) 110 via a host bus 120 The north bridge 140 is generally considered an application specific chip set that provides connectivity to various buses, and integrates other system functions such as a memory interface. For example, an Intel 820E and/or 815E chip set, available from the Intel Corporation of Santa Clara, Calif., provides at least a portion of the north bridge 140. The chip set may also be packaged as an application specific integrated circuit (ASIC). The north bridge 140 typically includes functionality to couple the main system memory 150 to other devices within the information handling system 100. Thus, memory controller functions such as main memory control functions typically reside in the north bridge 140. In addition, the north bridge 140 provides bus control to handle transfers between the host bus 120 and a second bus(es), e.g., PCI bus 170. A third bus(es) 168 may also comprise other industry standard buses or proprietary buses, e.g., ISA, SCSI, I$^2$C, SPI, USB buses through the south bridge(s) (bus interface) 162. The disk controller 160 controls reads and writes from and to the hard disk 170.

Figure 2:
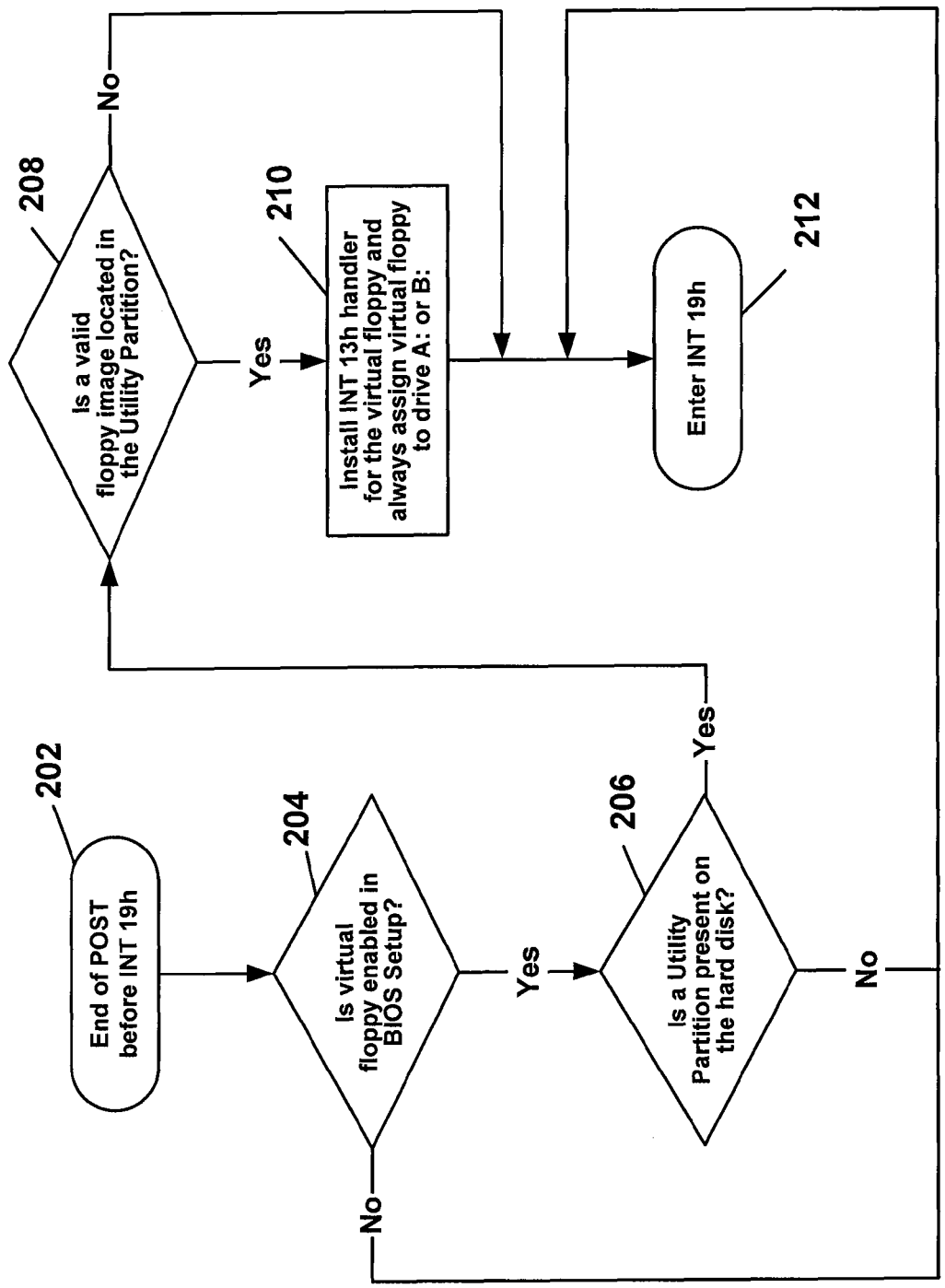
FIG. 2 is a schematic flow diagram of a BIOS hooking INT13h chain for installation of a virtual floppy, according to a specific example embodiment of the present disclosure.

Referring to FIG. 2, depicted is a schematic flow diagram of a BIOS hooking INT13h chain for installation of a virtual floppy, according to a specific example embodiment of the present disclosure. The basic input-output system (BIOS) start-up of the information handling system 100 may provide a setup option to enable a "virtual floppy" feature, e.g., "virtual floppy support." "Enable" and "Disable" options for the virtual floppy may be stored in non-volatile memory, e.g., electrically erasable programmable read-only memory (EEPROM), FLASH memory, CMOS with battery back-up, etc., so that these settings can be persistent across information handling system 100 reboots.

In step 202, when power-on self-test (POST) ends, all bootable devices, e.g., Initial Program Load (IPL) and Boot Connection Vectors (BCV) have been detected and chained in the boot order. In step 204, The BIOS will determine whether the virtual floppy support is enabled in the BIOS setup. If not, then INT19h (INT19h is the last step in a normal POST and then hands off control to the OS) is activated in step 212. If so, in step 206, the BIOS will search for a Utility Partition (UP) on the hard disk 170. If the UP is found on the hard disk 170, then step 208 looks for a valid floppy image in the UP. If a valid virtual floppy image is not found in the UP then INT19h is activated in step 212. If a valid floppy image is found in the UP then, in step 210, the BIOS will hook the INT13h chain for the virtual floppy image, claiming drive number 0 (e.g., A: drive), if there is no other floppy drive in the information handling system 100; or drive number 1 (e.g., B: drive), if there is an existing floppy drive in the information handling system 100. After a drive number is assigned in step 210 to the virtual floppy image, INT19h is activated in step 212.

Figures 3, 4:
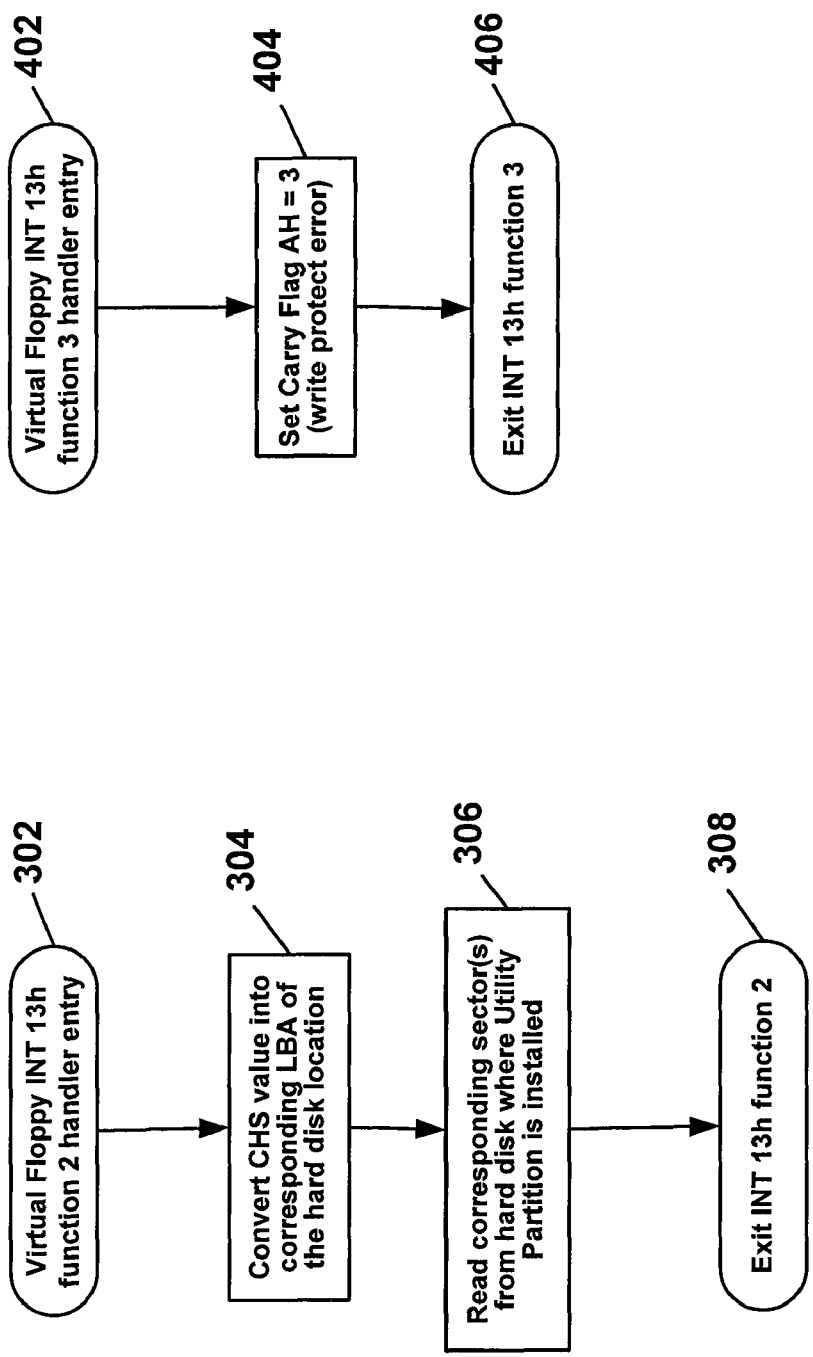
FIG. 3 is a schematic flow diagram of a BIOS INT13h function 2 (read sectors) of the virtual floppy installed in FIG. 2, according to a specific example embodiment of the present disclosure.
FIG. 4 is a schematic flow diagram of a BIOS INT13h function 3 (write sectors) of the virtual floppy installed in FIG. 2, according to a specific example embodiment of the present disclosure.

Referring to FIG. 3, depicted is a schematic flow diagram of a BIOS INT13h function 2 (read sectors) of the virtual floppy installed in FIG. 2, according to a specific example embodiment of the present disclosure. At run time, in step 302 the BIOS responds to an INT13h function 2 handler entry from the OS targeting the virtual floppy image in the UP. Unlike regular INT13h handlers, BIOS communications to the virtual floppy image that is stored inside the UP on the hard disk 170 instead of a physical floppy drive device. In step 304, in order to access the virtual floppy image in the UP, BIOS translates the caller's Cylinder, Heads and Sector (CHS) or Logical Block Addressing (LBA) values into corresponding CHS or LBA values of the hard disk so that the virtual floppy image may be read, in step 306, from the correct locations of the UP on the hard disk 170. After the desired driver is read from the virtual floppy image, in step 308 there is an exit from INT13h function 2.

For example, when reading sector(s) from drive (INT13h function 2)

```
INPUT:    AH = 02H
          DL = Drive number (0 – 1), bit 7 = 0 for floppy
          DH = Head number
          CH = Lower 8 bits of Track number
          CL = Bits <5, 0> sectors per track, bits <7, 6> top 2 bits of
               track number
          AL = number of sectors to read
          ES:BX = address of buffer to fill
OUTPUT:   Carry set - Status non 0
          AL = number of sectors transferred
          AH = status
          ES:BX = address of filled buffer
```

Referring now to FIG. 4, depicted is a schematic flow diagram of a BIOS INT13h function 3 (write sectors) of the virtual floppy installed in FIG. 2, according to a specific example embodiment of the present disclosure. In step 402, the INT13h function 3 is entered for writing sector(s) to the virtual floppy. In step 404, the carry flag AH=3 is set (write protect error). In step 406, there is an exit from INT13h function 3. In this particular example the virtual floppy is write protected.

For example, when writing sector(s) to drive (INT13h function 3)

```
INPUT:    AH = 03H
          DL = Drive number (0 – 1), bit 7 = 0 for floppy
          DH = Head number
          CH = Lower 8 bits of Track number
          CL = Bits <5, 0> sectors per track, bits <7, 6> top 2 bits of
               track number
          AL = number of sectors to write
          ES:BX = address of buffer used to write to drive
OUTPUT:   Carry set - Status non 0
          AL = number of sectors transferred
          AH = status
```

An advantage, according to the teachings of this disclosure, may be greatly increased availability of memory size for storing device drivers compared to other non-volatile memory storage solutions, e.g., EEPROM and/or FLASH memory. Another advantage may be easy updating of new drivers with a new virtual floppy image installed in the UP of the disk drive 170. The storage of the virtual floppy image is internal to the hard disk 170 of the information handling system 100 and is persistent, e.g., no loss of driver information between system boot-ups. No external storage media need be used so that searching for and physically installing an external storage media having the desired device drivers is no longer necessary when a new device driver installation is required.

The embodiments of this disclosure may also be implemented in other operating systems such as Linux and Netware, etc. Extensible Firmware Interface (EFI) Boot Manager may be used in accordance with the teachings of the present disclosure in place of BIOS in an information handling system 100, e.g., Linux OS.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. A method for presenting drivers stored on a utility partition of a hard disk to an operating system installer, said method comprising the steps of:
    determining, during installation of an operating system, whether a virtual floppy is enabled in a basic input/output system (BIOS) setup;
    determining whether a utility partition is present on a hard disk;
    determining whether a valid floppy image is located in the utility partition;
    installing an INT13h handler for the virtual floppy;
    assigning an unused floppy drive number to the virtual floppy; and
    entering an INT19h.

2. The method according to claim 1, wherein the step of determining whether a virtual floppy is enabled is performed at the end of a power-on self-test (POST).

3. The method according to claim 2, wherein if the virtual floppy is not enabled then entering the INT19h.

4. The method according to claim 2, wherein if the utility partition is not present on the hard disk then entering the INT19h.

5. The method according to claim 1, further comprising the steps of:
    entering an INT13h function 2 handler for the virtual floppy;
    converting cylinder, heads and sector (CHS) values of the virtual floppy to corresponding CHS values of the hard disk;
    reading at least one corresponding CHS sector from the hard disk; and
    exiting the INT13h function 2 handler.

6. The method according to claim 5, wherein the at least one corresponding CHS sector is in the utility partition on the hard disk.

7. The method according to claim 1, further comprising the steps of implementing necessary INT13h functions, including function 3 for sector writes.

8. The method according to claim 1, wherein the step of assigning the unused floppy drive number to the virtual floppy comprises the step of assigning the virtual floppy as drive A.

9. The method according to claim 1, wherein the step of assigning the unused floppy drive number to the virtual floppy comprises the step of assigning the virtual floppy as drive B when a physical floppy is drive A.

10. A method for providing device drivers during an operating system installation on an information handling system, said method comprising the steps of:
supplying a hard disk having at least one device driver in a floppy disk image on a utility partition of the hard disk, the hard disk being coupled to an information handling system, wherein the at least one device driver is presented to the information handling system during installation of an operating system;
enabling a virtual floppy in a basic input/output system (BIOS) setup of the information handling system;
installing an INT13h handler for the virtual floppy;
assigning an unused floppy drive number to the virtual floppy; and
entering an INT19h.

11. The method according to claim 10, wherein the step of enabling the virtual floppy is performed at the end of a power-on self-test (POST) of the information handling system.

12. The method according to claim 10, further comprising the steps of:
entering an INT13h function 2 handler for the virtual floppy;
converting cylinder, heads and sector (CHS) values of the virtual floppy to corresponding CHS values of the hard disk;
reading at least one corresponding CHS sector from the hard disk; and
exiting the INT13h function 2 handler.

13. The method according to claim 10, further comprising the steps of implementing necessary INT13h functions, including function 3 for sector writes.

14. An apparatus in an information handling system having a hard disk drive with a utility partition in which a virtual floppy disk image of at least one storage device driver is stored, the apparatus comprising:
a hard disk with a utility partition in which a virtual floppy disk image of at least one storage device driver is stored, the hard disk being coupled to an information handling system, wherein the storage device driver is presented to the information handling system during installation of an operating system; and
a basic input/output system (BIOS) in the information handling system, the BIOS having a virtual floppy setup; wherein
the BIOS has an INT13h handler for the virtual floppy,
the BIOS assigns an unused floppy drive number to the virtual floppy, and
the BIOS enters an INT19h.

15. The apparatus according to claim 14, wherein the BIOS enables the virtual floppy at the end of a power-on self-test (POST) of the information handling system.

16. The apparatus according to claim 14, further comprising:
the BIOS enters an INT13h function 2 handler for the virtual floppy;
the BIOS converts cylinder, heads and sector (CHS) values of the virtual floppy to corresponding CHS values of the hard disk;
the BIOS reads at least one corresponding CHS sector from the hard disk; and
the BIOS exits the INT13h function 2 handler.

* * * * *